United States Patent [19]

Richter

[11] Patent Number: 5,034,179

[45] Date of Patent: Jul. 23, 1991

[54] METHOD OF AND APPARATUS FOR DISCONTINUOUS MANUFACTURE OF MULTILAYER, CO-EXTRUDED, HOSE-LIKE PREFORMS FROM THERMOPLASTICS MATERIAL

[76] Inventor: Günter Richter, Johannistal 12, D-5230 Altenkirchen, Fed. Rep. of Germany

[21] Appl. No.: 472,335

[22] Filed: Jan. 26, 1990

[30] Foreign Application Priority Data

Jan. 26, 1989 [DE] Fed. Rep. of Germany ....... 3902270

[51] Int. Cl.[5] .............................................. B29C 47/06
[52] U.S. Cl. .................................... 264/515; 264/541; 264/173; 425/133.1; 425/532; 425/381; 425/462; 425/466
[58] Field of Search ................ 264/515, 173, 514, 541; 425/466, 381, 462, 532, 133.1

[56] References Cited

U.S. PATENT DOCUMENTS

| | | | |
|---|---|---|---|
| 4,548,568 | 10/1985 | Herbert et al. | 425/131.1 |
| 4,548,569 | 10/1985 | Pitigliano et al. | 425/133.1 |
| 4,758,144 | 7/1988 | Becker | 425/133.1 |
| 4,770,620 | 9/1988 | Steinecke et al. | 425/133.1 |
| 4,838,778 | 6/1989 | Becker et al. | 425/133.1 |
| 4,846,648 | 7/1989 | Spence et al. | 425/133.1 |
| 4,937,035 | 6/1990 | Richter | 264/515 |

FOREIGN PATENT DOCUMENTS 3410535 10/1985 Fed. Rep. of Germany ... 425/131.1
3635334 10/1986 Fed. Rep. of Germany .
58-191130 11/1983 Japan .................... 264/514

Primary Examiner—Jeffery Thurlow
Attorney, Agent, or Firm—Toren, McGeady & Associates

[57] ABSTRACT

In the discontinuous manufacture of multilayer, co-extruded, hose-like thermoplastics material preforms used in the production of large volume multilayer hollow members in a divided blow mold, at least two different annular shaped material melts are brought together in series within an axially extending annular piston to form a multilayer material melt. An annular flow channel in the piston receives the layers of material melt. The flow channel widens in a funnel-like manner toward an annular storage space. The preform is subsequently ejected from the storage space through an annular nozzle gap by the annular piston moving in its axial direction. The annular piston acts as a co-extrusion head and is pressed upward by the multilayer material melts. In supplying the material melts from extruders into the flow channel of the piston, the material melts flow first in the extrusion direction and then are redirected for flow radially inwardly into the flow channel of the piston. By the redirection of the material melts in the transition from the extruder to the co-extruder or piston, no cross-sectional changes occur and weak points are eliminated or reduced to a point where they have no deleterious effect.

10 Claims, 1 Drawing Sheet

METHOD OF AND APPARATUS FOR DISCONTINUOUS MANUFACTURE OF MULTILAYER, CO-EXTRUDED, HOSE-LIKE PREFORMS FROM THERMOPLASTICS MATERIAL

BACKGROUND OF THE INVENTION

The present invention is directed to a method of discontinuous manufacture of multilayer, co-extruded, hose-like preforms from thermoplastics material for the production of large volume, multilayer hollow members in a divided blow mold, where at least two different annularly shaped material melts are brought together in series within annular flow chamber of an annular piston serving as a co-extrusion head. The flow channel forms a multilayer material melt and the channel widens in a funnel-like manner in the direction away from the inlet of the material melts. From the annular channel, the combined multilayer material melts enter an annular storage space and are subsequently ejected through a narrow annular gap by the annular piston moving in its axial direction. The piston is pressed upwardly by the inflowing multilayer material melt. The invention is also directed to an apparatus for carrying out the method.

A method and apparatus for performing the method are disclosed in DE-OS 36 35 334. In this apparatus, the individual extruders are connected in the radial direction to the coextrusion head or annular piston. Accordingly, the material melt supplied from an extruder discharges directly radially into the movable annular piston. The extruders are pivoted in case of axial displacement of the annular piston. This pivoting motion of the extruders results in cross-sectional changes in the transition region between the exit channel of the extruder and the entrance channel of the annular piston, and such cross-sectional changes have a deleterious effect on the hose-like preform produced. Due to this arrangement, the preform may have weak points in the region of the flow lines of the individual material melts, and, during the blowing operation of the preform, can result in considerable impairment of the layer thickness and possibly even in the destruction of a layer. Such a result renders the finished hollow member useless.

SUMMARY OF THE INVENTION

Therefore, the primary object of the present invention is to improve the known method so that cross-sectional changes no longer occur in the transition region between the extruders and the annular piston. As a result, weak points are avoided or reduced to such an extent that they are no longer detrimental to the finished hollow member.

In accordance with the present invention, the individual material melts are redirected from the extrusion direction before the melt enters into the annular piston or co-extrusion head where the melt flows radially inwardly through passageways into the flow channels of the annular piston. Accordingly, the extruders are not arranged radially with respect to the annular piston, instead the extrusion direction is arranged at an angle to the radial direction. The extrusion direction of the material melts is offset radially with respect to the annular piston and is redirected before it flows into the annular piston. The redirection occurs in the angular range of approximately 90° to 135°. As a result, only a rotary motion around an axis occurs between the realigned passageways in the transition region between the extruder and the annular piston, and such rotary motion eliminates any cross-sectional changes.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
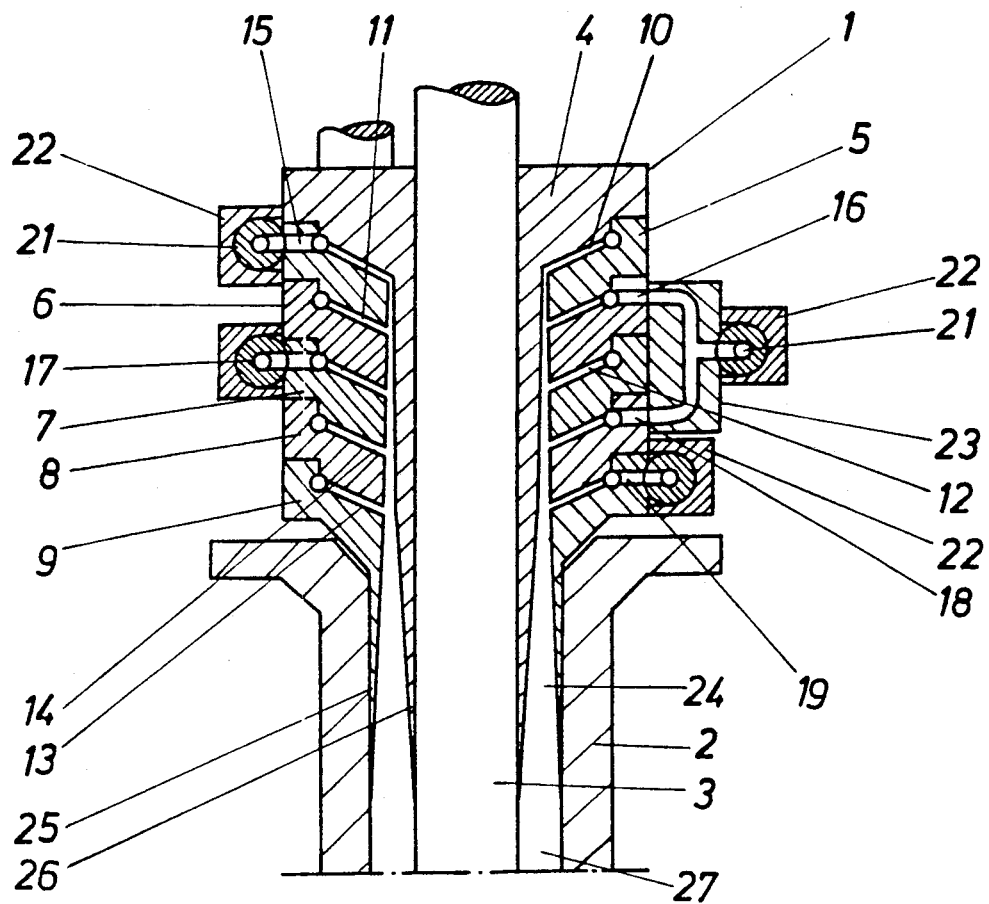
FIG. 1 is a vertical sectional view through a portion of a device embodying the present invention.
Figure 2:
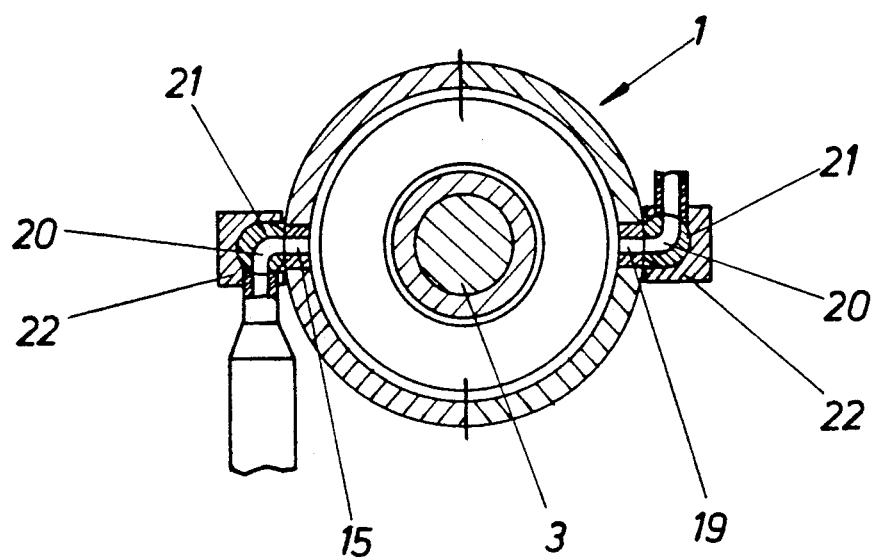
FIG. 2 is a transverse sectional view in two different planes through the device illustrated in FIG. 1.

A device is shown in FIGS. 1 and 2 for manufacturing a multilayer, co-extruded, hose-like preform from thermoplastics material for use in the production of large volume multilayer hollow members in a divided blow mold. In the device the wall of the hose-like preform to be manufactured and the wall of the subsequently formed hollow member is made up of five material melts.

The device includes a multipart annular piston 1, serving as a co-extruder, arranged to be axially displaceable in a storage jacket 2, only partly shown, of a housing, not illustrated. An axially extending spindle 3, coaxial with the annular piston 1, extends through the piston and the storage jacket 2. Accordingly, the spindle 3 serves as a guide for the annular piston 1. Known displacement drives, not shown, are provided for the annular piston 1 and the spindle 3. Such drives can be powered by a liquid pressure means.

As shown in FIG. 1, annular piston 1 is made up of six rigidly connected annular shaped piston parts 4–9, connected together so that annularly shaped first flow channels 10–14 are formed between adjacent annular shaped piston parts 4,5; 5,6; 6,7; 7,8 and 8,9. Each of these annular shaped flow channels 10–14 extends transversely of the axial direction of the piston, sloping downwardly in the inward direction relative to the piston axis. Each of the first flow channels 10–14 is connected to a radially extending first flow channel bore 15–19, with an extruder connected to the radially outer end of each bore for receiving the material melt from the extruder. In the illustrated embodiment, four extruders, not illustrated, are connected with the annular piston 1. Each of these extruders has a spherically-shaped connector member 21 at its ejection or discharge end with the connector member defining a redirection channel 20, note FIG. 2. The connector member 21 is located within a contact pressure member 22. The contact pressure member is connected to the annular piston by screws. A compression spring, not illustrated, can be positioned between the contact pressure member 22 and the spherically shaped connector member 21, if required, and the compression spring assures that the connector member 21 always bears with an accurately predetermined force against the piston 1. The annular piston has a pan or dish-shaped recess in its outer surface in the region of the first flow channel bores 15, 17, 19 for the secure engagement of the connector members 21 of the individual extruders with the annular piston 1. The spherically-shaped connector members 21 can rotate for alignment with the bores 15, 17, 19.

An intermediate member 23 is located at the exterior of the annular piston 1, outwardly of the bores 16, 18 and this intermediate member connects each of the bores 16, 18 with the connector member 21 to a single extruder. Accordingly, the two first flow channel bores 16, 18 are in communication with a single extruder receiving a uniform material melt.

The annular-shaped first flow channels 10–14 communicate, in series in the axial direction, into an annularly shaped second flow channel 24, located concentrically in the axially extending annular piston 1. The lower end of the flow channel 24, as viewed in FIG. 1, is defined by axially extending annular shaped projections 25, 26, extending downwardly, respectively, from the lower piston part 9 and the upper piston part 4. The second flow channel 24 gradually widens in the downward direction in a funnel-like manner to the upper end of annular storage space 27 formed between the inner surface of the storage jacket 1 and the surface of the spindle 3.

To assure that the extruders pivotally or rotatably connected to the annular piston 1 can follow the axial motion of the annular piston, the extruders are supported in an articulated joint, not shown, and the joint can, in addition, be displaced in the axial direction of the extruder.

In the above-described embodiment, the material melt supplied through the first flow channel bore 15 consists of polyethylene. Such material melt forms the inner layer of the hose-like preform and of the subsequently blown hollow member manufactured from the preform. Another material melt consisting of a barrier material, such as EVOHPA, is supplied through the first channel bore 19, and forms the outer layer of the preform and of the blown hollow member. Another material melt of barrier material flows into the annular piston 1 through the first flow channel bore 17 and forms a so-called intermediate layer. Yet another material melt, consisting of an adhesion promoter, is supplied to the second flow channel 24 in the annular piston 1 through the first flow channel bores 16, 18. The adhesion promotion material melt assures an effective interconnection between the inner layer and the intermediate layer, as well as between the intermediate layer and the outer layer of the hose-like preform and of the blown hollow member produced from the preform.

Finally, it should be noted that the first flow channel bores 15, 19 and the associated connector members 21 of the corresponding extruders are arranged offset relative to one another by 180° around the annular piston for forming the inner layer and the outer layer. This arrangement provides that possibly formed weak points are compensated by overlap in the region of the flowing together of the annular-shaped material melts, so that there is no impairment of the preform or of the blown hollow member. Further, first flow channel bores 16, 18 are offset through 180° with respect to the first flow channel bore 17. This also affords a mutual overlap in the region of the flowing together of the annularly shaped material melts.

While specific embodiments of the invention have been shown and described in detail to illustrate the application of the inventive principles, it will be understood that the invention may be embodied otherwise without departing from such principles.

I claim:

1. Method for discontinuous production of multi-layer, co-extruded, hose-like thermoplastics material preforms for use in the production of large-volume, multilayer hollow members in a divided blow mold, comprising the steps of providing an axially elongated annular piston having a radial direction and containing a second annular flow channel extending in the axial direction thereof and having a first axially extending end region and a second axially extending end region introducing material melts from extruders into first annular flow channels in the first end region with the first annular flow channels spaced apart in the axial direction of the annular piston and extending transversely of the annular piston and then introducing the material melts into the second annular flow channel with the second annular flow channel widening in the axial direction from the location of the introduction of the material melts in the first end region toward the second end region, flowing the material melts from the second annular flow channel into an annular storage space at the second end region, and subsequently ejecting the multilayer preform from the storage space, wherein the improvement comprises flowing the individual material melts into the first annular flow channels in an extrusion direction out of the extruder with the extrusion direction disposed at an angle to the radial direction of the annular piston and adjacent to the annular piston changing the flow of the material melts from the extrusion direction to the radial direction before entering the annular piston, and flowing each of the material melts through a different separate bore into the first annular flow channels.

2. Method, as set forth in claim 1, wherein flowing the material melts for forming an inner layer and an outer layer of the hose-like preform into the annular piston at locations offset approximately 180° from one another around the annular piston.

3. Method, as set forth in claim 2, wherein flowing material melts for forming intermediate layers of the hose-like preform between the outer layer and the inner layer through bores offset approximately 180° with respect to adjacent bores.

4. Method, as set forth in claim 1, comprising flowing material melts into said annular piston for forming an inner layer, an outer layer and intermediate layers and locating adjacent flows of the material melts offset approximately 180° apart around the annular piston.

5. Method, as set forth in claim 2 or 4, wherein using material melts of the same material for the outer layer and the inner layer.

6. Method, as set forth in claim 3 or 4, wherein using the same material for at least two intermediate layers.

7. Method, as set forth in claim 6, wherein the material melts of the same material forming at least two intermediate layers are supplied from one extruder to the annular piston.

8. Device for discontinuous production of multilayer co-extruded hose-like thermoplastics material preforms for use in the production of large volume multilayer hollow members in a divided blow mold, comprising an axially extending annular piston having a first end and a second end spaced apart in the axial direction with said piston acting as a co-extruder head, said piston having a number of axially spaced annularly-shaped first flow channels extending transversely of and inclined relative to the axial direction of said piston, a plurality of extruders located exteriorly of said piston, each said extruder having at least one first flow channel bore connected to one of said first flow channels, said piston forming an axially extending second flow channel extending transversely of and connected to said first flow channels, said second flow channel has a first end closer to the first end of said piston and a second end in the region of the second end of said piston, said second flow channel widening in a funnel-like manner in the direction from the first end to the second end thereof, means forming an annular storage space located at the second end of said second flow channel for receiving the preform from the second flow channel, wherein the improvement comprises that each extruder comprises a spherically-shaped connector member having a passageway connecting the extruder to said piston, said passageway having a first part closer to said extruder than a second part, with the first and second parts being disposed angularly relative to one another, said second part extending radially relative to said annular piston, and a contact pressure member enclosing said connector member and being connected to said piston.

9. Device, as set forth in claim 8, wherein said annular piston has an exterior axially extending surface, a dish-like recess in said outer surface for each said contact pressure member for partially receiving the spherically-shaped contact member located within the contact pressure member.

10. Device, as set forth in claim 8 or 9, wherein a compression spring is located between said contact pressure member and the associated spherically-shaped connector member.

* * * * *